United States Patent
Lutnick

(10) Patent No.: US 7,788,171 B2
(45) Date of Patent: Aug. 31, 2010

(54) PRODUCTS AND PROCESSES FOR MANAGING REVENUE SHARING

(75) Inventor: Howard W. Lutnick, New York, NY (US)

(73) Assignee: CFPH, LLC, New York, NY (US)

(*) Notice: Subject to any disclaimer, the term of this patent is extended or adjusted under 35 U.S.C. 154(b) by 0 days.

(21) Appl. No.: 11/859,065

(22) Filed: Sep. 21, 2007

(65) Prior Publication Data

US 2009/0083168 A1 Mar. 26, 2009

(51) Int. Cl.
*G06Q 40/00* (2006.01)
*G06Q 30/00* (2006.01)

(52) U.S. Cl. .................. 705/38; 705/14.11; 705/14.16; 705/35

(58) Field of Classification Search ................ 705/38, 705/35, 14.11, 14.16
See application file for complete search history.

(56) References Cited

U.S. PATENT DOCUMENTS

| | | | | |
|---|---|---|---|---|
| 5,940,812 | A * | 8/1999 | Tengel et al. ................. | 705/38 |
| 6,739,506 | B1 * | 5/2004 | Constantine ................ | 235/380 |
| 6,832,240 | B1 | 12/2004 | Dutta | |
| 7,349,871 | B2 | 3/2008 | Labrou et al. | |
| 2002/0138616 | A1 | 9/2002 | Basson et al. | |
| 2003/0050850 | A1 | 3/2003 | Sesek | |
| 2003/0061146 | A1 | 3/2003 | Thompson | |
| 2003/0154135 | A1 | 8/2003 | Covington et al. | |
| 2003/0163414 | A1 | 8/2003 | O'Brien et al. | |
| 2003/0177277 | A1 * | 9/2003 | Dascalu ....................... | 709/313 |
| 2004/0035923 | A1 | 2/2004 | Kahr | |
| 2004/0199458 | A1 * | 10/2004 | Ho ............................... | 705/38 |
| 2004/0254857 | A1 | 12/2004 | Onizuka | |
| 2005/0187871 | A1 | 8/2005 | Yeung et al. | |
| 2005/0203839 | A1 | 9/2005 | Dowell et al. | |
| 2005/0273406 | A1 * | 12/2005 | Lebda et al. .................. | 705/35 |
| 2006/0074793 | A1 | 4/2006 | Hibbert et al. | |
| 2006/0111986 | A1 | 5/2006 | Yorke et al. | |
| 2007/0156446 | A1 | 7/2007 | Jolly et al. | |
| 2007/0198384 | A1 * | 8/2007 | Prouty ......................... | 705/35 |
| 2008/0046365 | A1 * | 2/2008 | Kelly .......................... | 705/40 |
| 2008/0162304 | A1 | 7/2008 | Ourega | |
| 2008/0255977 | A1 | 10/2008 | Altberg et al. | |
| 2008/0262962 | A1 * | 10/2008 | Alliotts ....................... | 705/38 |

OTHER PUBLICATIONS

Board of Governors of the Federal Reserve System. "Subject: Referral of RESPA Violations to the Department of Housing and Urban Development (HUD)" FRB: Consumer Affairs Letter CA 01-02. Apr. 4, 2001 (4 pages).*

Berkeley, Charles T. "The 'Straight-Skinny' on Referral Fees", Jul. 21, 2005 www.mortgageresults.com/pdf_new/Straight%20Skinny%20on%20Referral%20Fees.pdf (5 pages).*

(Continued)

*Primary Examiner*—James P Trammell
*Assistant Examiner*—Elda Milef
(74) *Attorney, Agent, or Firm*—Mark A. Miller

(57) ABSTRACT

Various techniques of distributing revenue and/or other money, selecting/bonding delivery agents, and performing other tasks are providing herein. Methods include distributing portions of loan payments to one or more referrers associated with one or more loans, bonding of delivery agents, selecting delivery agents, allocating portions of credit card payments and/or sharing advertisement revenue. Other apparatus and methods are disclosed.

28 Claims, 7 Drawing Sheets

OTHER PUBLICATIONS

"Payment Eliminator, Pay Off Your Debt in Months Through Bi-weekly Payments and Referral Marketing" http://web.archive.org/web/20060619204102/paymenteliminator.com/works.php. Copyright 2005. Home Investors LLC. Retrieved Mar. 17, 2009 (3 pages).*

Microsoft Computer Dictionary. 5th ed. Microsoft Corporation 2002. p. 129 (2 pages).*

U.S. Appl. No. 11/859,095, filed Sep. 21, 2007, Lutnick.

U.S. Appl. No. 11/859,118, filed Sep. 21, 2007, Lutnick.

David English, "Site Selection-The Three Rules of Retailing-Location, Location, and Location-Extend to E-commerce," Computer Shopper, Mar. 1, 2000 at 238.

USPTO Office Action for U.S. Appl. No. 11/859,095, filed Aug. 20, 2009 (14 pages).

USPTO Office Action for U.S. Appl. No. 11/859,118, filed Jul. 10, 2009 (5 pages).

USPTO Office Action for U.S. Appl. No. 11/859,118, filed Nov. 19, 2009 (11 pages).

USPTO Office Action for U.S. Appl. No. 11/859,095, May 13, 2009 (6 pages).

USPTO Office Action for U.S. Appl. No. 11/859,095, filed Jan. 29, 2010 (22 pages).

Notification of Transmittal of the International Search Report and Written Opinion of the ISA or the Declaration for International Application No. PCT/US07/79171, mailed Jan. 28, 2008 (10 pages).

* cited by examiner

PRODUCTS AND PROCESSES FOR MANAGING REVENUE SHARING

BRIEF DESCRIPTION OF THE DRAWINGS

The accompanying drawings are not intended to be drawn to scale. In the drawings, each identical or similar component that is illustrated in various figures is represented by a like numeral. For purposes of clarity, not every component may be labeled or act identified in every drawing. In the drawings.

DETAILED DESCRIPTION

Terms

Figure 1:
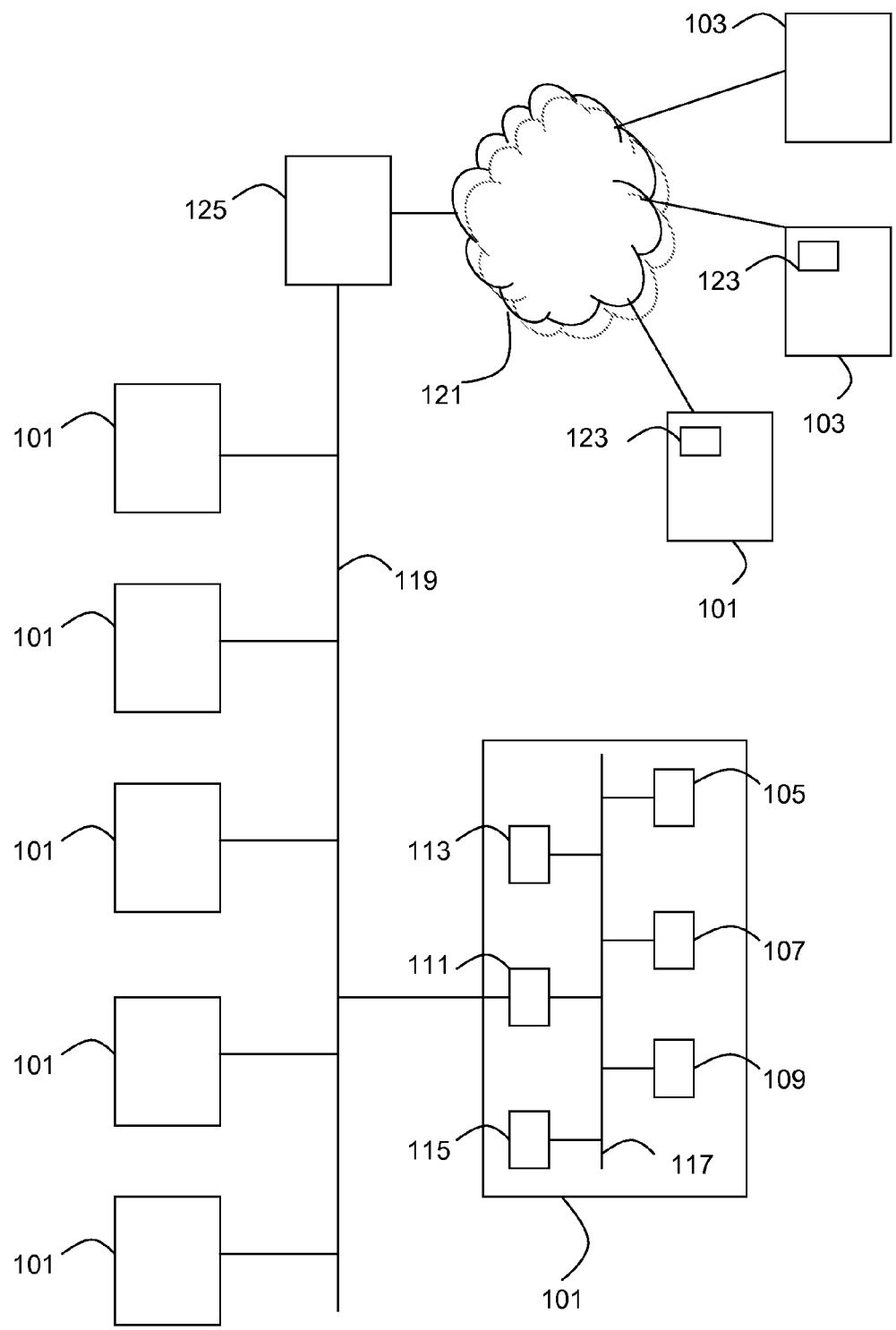
FIG. 1 shows a computer system architecture that may be used to perform one or more acts in accordance with some embodiments of the present invention.

A reference to "another embodiment" in describing an embodiment does not imply that the referenced embodiment is mutually exclusive with another embodiment (e.g., an embodiment described before the referenced embodiment), unless expressly specified otherwise. The term "product" means any machine, manufacture and/or composition of matter, unless expressly specified otherwise. The term "process" means any process, algorithm, method or the like, unless expressly specified otherwise. Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis. The term "invention" and the like mean "the one or more inventions disclosed in this application", unless expressly specified otherwise. The term "variation" of an invention means an embodiment of the invention, unless expressly specified otherwise.

The terms "including", "comprising", "having", "containing", "involving", and variations thereof mean "including but not limited to", unless expressly specified otherwise. The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on". Similarly, the phrase "based on" does not mean "based on the entirety of", "based on all of", or variations thereon, unless expressly specified otherwise.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "calculating" and grammatical variants thereof (e.g., to calculating a price, calculating a value) is used in an extremely broad sense. The term "calculating" encompasses a wide variety of actions and therefore "calculating" can include computing, processing, deriving, investigating, looking up (e.g., looking up in a table, a database or another data structure), ascertaining and the like. Also, "calculating" can include receiving (e.g., receiving information), accessing (e.g., accessing data in a memory) and the like. Also, "calculating" can include resolving, selecting, choosing, establishing, and the like.

The term "calculating" does not imply certainty or absolute precision, and therefore "calculating" can include estimating, predicting, guessing and the like. The term "calculating" does not imply that mathematical processing must be performed, and does not imply that numerical methods must be used, and does not imply that an algorithm or process is used. The term "calculating" does not imply that any particular device must be used. For example, a computer need not necessarily perform the calculating.

Similarly, the term "determining" is used in an extremely broad sense. The term "determining" should be understood to be at least as broad as the term "calculating".

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the present invention", unless expressly specified otherwise.

The term "electronic message" and variations thereof used herein should be understood to mean any electronic representation of information. For example an HTTP message, an XMLHTTP request, an SMS message, an MMS message, a database message (e.g., SQL message) or any other series of electrical signals that represent information may be considered an electronic message. An electronic message does not include information identifying a source and/or destination such as the information typically present in a TCP/IP packet header. Rather, the electronic message should be considered the body/content of such a packet.

The terms "representation" and "indication" of a thing and variations thereof used herein in reference to a thing should be understood to refer to any indication of at least a portion and/or characteristic of the thing. An indication of information, for example, may include any indication of at least a portion of the information. In some embodiments, the information may be determined by a person or computing device from the indication of the information. In some example implementations, an indication may include a copy of the information in any of a variety of formats, compressions, and/or encryptions. In another example implementation, an indication may include an index or other identifier, such as a position in a list, an ID number, or a database key. An indication of a thing may be in the same or different medium as an original thing. For example, a number "1" may indicate a sound, a color, a menu item, or any other thing depending, e.g., on the configuration of a computing system configured to interpret the number. In some implementations, an indication may be divided into a plurality of portions, such as a plurality of electronic messages being transmitted from one location to another. In some implementations, multiple indications may be combined into a single message.

Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers (e.g., "a plurality of first widgets" indicates two or more widgets that are distinct from other widgets). For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Disclosed Examples and Terminology are Not Limiting

Neither the Title (set forth at the beginning of the first page of the present application) nor the Abstract (set forth at the end of the present application) is to be taken as limiting in any way as the scope of the present invention. An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way. The preambles of the claims that follow recite purposes, benefits and possible uses of the claimed invention only and do not limit the claimed invention.

Numerous embodiments are presented for illustrative purposes only. The described embodiments are not, and are not intended to be, limiting in any sense. One of ordinary skill in the art will recognize that the present invention may be practiced with various modifications and alterations, such as structural, logical, software, and electrical modifications. Although particular features of the present invention may be described with reference to one or more particular embodiments and/or drawings, it should be understood that such features are not limited to usage in the one or more particular embodiments or drawings with reference to which they are described, unless expressly specified otherwise.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long periods of time (e.g., weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention. Unless otherwise specified explicitly, no component/feature is essential or required.

Although process acts, algorithms or the like may be described in a particular sequential order, such processes may be configured to work in different orders. In other words, any sequence or order of acts that may be explicitly described does not necessarily indicate a requirement that the acts be performed in that order. The acts of processes described herein may be performed in any order. Further, some acts may be performed simultaneously despite being described or implied as occurring non-simultaneously (e.g., because one act is described after the other act). Further more, acts which are described as separate may be performed as a single act in some embodiments. Moreover, the illustration of a process by its depiction in a drawing does not imply that the illustrated process is exclusive of other variations and modifications thereto, does not imply that the illustrated process or any of its acts are necessary to the present invention, and does not imply that the illustrated process is preferred.

Although a process may be described as including a plurality of acts, that does not imply that all or any of the acts are preferred, essential or required. Various other embodiments within the scope of the present invention may include other processes that omit some or all of the described acts. Unless otherwise specified explicitly, no act is essential or required.

Although a process or product may be described singly or without reference to other processes or products, in some embodiments the process or product may interact with other processes or products. For example, such interaction may include linking one business model to another business model. Such interaction may be provided to enhance the flexibility or desirability of the process.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category. Also, an enumerated list of items (which may or may not be numbered) does not imply that any or all of the items are equivalent to each other or readily substituted for each other.

Computing

It should be appreciated that the various processes described herein may be implemented by, e.g., appropriately programmed computer systems, e.g., general purpose computers 101 and/or computing devices 103, such as those illustrated in FIG. 1. A computing device 103 may include a specialized or general purpose computing device such as a cellular phone, a personal digital assistant, and/or any other portable or non-portable computing system that is not a general purpose computer.

A "processor" 105 means one or more microprocessors, central processing units (CPUs), computing devices, microcontrollers, digital signal processors, application specific integrated circuits, or like devices or any combination thereof. A processor may include an Intel® Pentium®, Centrino®, and/or Core® processor. Typically, a processor 105 will receive instructions (e.g., from a memory or like device), and execute those instructions, thereby performing one or more processes defined by those instructions.

Thus a description of a process is likewise a description of an apparatus for performing the process. The apparatus that performs the process may include, e.g., a processor 105 and those input devices and/or output devices (e.g., a keyboard 107, mouse, trackball, microphone, touch screen, printing device, display screen 109, speaker, network interface 111) that are appropriate to perform the process.

Further, programs (i.e., collections of instructions) that implement such methods (as well as other types of data) may be stored and transmitted using a variety of media (e.g., machine-readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

In some embodiments, processor 105 may execute an operating system which may include, for example, the Windows-based operating systems (e.g., Windows NT, Windows 2000 (Windows ME), Windows XP, Windows Vista) available from the Microsoft Corporation, MAC OS System X operating system available from Apple, one or more of the Linux-based operating system distributions (e.g., the Enterprise Linux operating system available from Red Hat, Inc.), the Solaris operating system available from Sun Microsystems, or UNIX operating systems available from various sources. Many other operating systems may be used, and the invention is not limited to any particular operating system.

The processor and operating system together may define a computer platform for which programs stored on a machine-readable medium may be written in various programming languages, including an object-oriented programming language, such as SmallTalk, Java, C++, Ada, Python, or C# (C-Sharp), functional programming languages, scripting programming languages such as JavaScript, and/or logical programming languages. Various aspects of the invention may be implemented in a non-programmed environment (e.g., documents created in HTML, XML or other format that, when viewed in a window of a browser program, render aspects of a GUI or perform other functions). Some implementations of the present invention may be implemented using a plurality of programming languages and techniques known collectively as AJAX to provide a user with an interactive web-based user interface.

Various embodiments of the present invention may include a network environment including one or more computing systems (e.g., general purpose computers 101, other computing devices 103) in communication through one or more communication networks (e.g., a LAN 119, the Internet 121). The computer systems may communicate directly or indirectly, via any wired or wireless medium (e.g., the Internet 121, LAN 119, WAN or Ethernet, Token Ring, a telephone line, a cable line, a radio channel, an optical communications line, commercial on-line service providers, bulletin board systems, a satellite communications link, cellular telephone networks, a WI-FI network, a Bluetooth communication link, a combination of any of the above).

Various aspects of the invention (e.g., program elements stored on machine-readable media and executable by one or more processors) may be distributed among one or more computer systems configured to provide a service to one or more client computer systems. For example, in some embodiments, a plurality of computing systems may be organized as a central authority connected to a LAN or other communication network. These computing systems may receive requests and other information from remote computing systems through the Internet 121.

In some embodiments of the present invention, one or more computer systems may act as one or more database servers. The database server may respond to database requests such as structured query language (SQL) queries by providing access to a database (e.g., searching of the database, writing to the database). The database server may maintain one or more database tables having information stored therein to facilitate the operation of some embodiments.

Aside from database servers, in some embodiments, one or more computer systems may act as a web server. A web server may be configured to respond to network requests (e.g., HTTP messages, XMLHTTP requests) from web browsers executed by remote computer systems. For example, a web browser 123 executed by a computing system may direct an HTTP message through the Internet 121 to an edge routing device 125 connected to the LAN 119. The edge routing device 125 may be configured to direct the HTTP message to the web server through the LAN 119. The web server may provide a response (e.g., an HTML document) to the web browser 123 through the edge routing device 125 and Internet 121. The web server may be configured to communicate with other computer systems (e.g., a database server) to generate responses to such a received request.

In some embodiments, a server computer/centralized authority may not be necessary or desirable. For example, the present invention may, in an embodiment, be practiced on one or more computing devices without a central authority. In such an embodiment, any functions described herein as performed by a server or data described as stored on a general purpose computer may instead be performed by or stored on one or more such computing devices.

The term "machine-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks 113 and other persistent memory. Volatile media include dynamic random access memory 115 (DRAM), which typically constitutes the main memory of a computer system. Transmission media include coaxial cables, copper wire and fiber optics, including the wires that comprise a system bus 117 coupled to the processor. Transmission media may include or convey acoustic waves, light waves and electromagnetic emissions, such as those generated during radio frequency (RF) and infrared (IR) data communications. Common forms of machine-readable media include, for example, a floppy disk, a flexible disk, a hard disk, a magnetic tape, any other magnetic medium, a CD-ROM, a DVD, any other optical medium, punch cards, a paper tape, any other physical medium with patterns of holes, a RAM, a PROM, an EPROM, a FLASH-EEPROM, any other memory chip or cartridge, a carrier wave, or any other medium from which a computer system can read.

Various forms of machine-readable media may be involved in carrying data (e.g., sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a machine-readable medium storing a program for performing the process. The machine-readable medium can store (in any appropriate format) those program elements that are appropriate to perform the process.

Where a process is described, in some embodiments the process may operate without any user intervention. In other embodiments, the process includes some human intervention (e.g., an act is performed by or with the assistance of a human).

Just as the description of various acts in a process does not indicate that all the described acts are required, embodiments of an apparatus may include one or more computer systems operable to perform some (but not necessarily all) of the described process.

Likewise, just as the description of various acts in a process does not indicate that all the described acts are required, embodiments of a machine-readable medium storing a program or data structure include a machine-readable medium storing a program that, when executed, can cause one or more processors to perform some (but not necessarily all) of the described process.

Where databases are described, it will be understood by one of ordinary skill in the art that (i) alternative database structures to those described may be readily employed, and (ii) other memory structures besides databases may be readily employed. Any descriptions of any sample databases presented herein are illustrative arrangements for stored representations of information. Any number of other arrangements may be employed besides those suggested herein. Further, any database format (including relational databases, object-based models and/or distributed databases) may be used to store and manipulate the data types described herein. Likewise, object methods or behaviors of a database may be used to implement processes described herein. In addition, the databases may, in a known manner, be stored locally or remotely from a device which accesses data in such a database.

Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

35 U.S.C. §112, Paragraph 6

In a claim, a limitation of the claim which includes the phrase "means for" or the phrase "step for" means that 35 U.S.C. §112, paragraph 6, applies to that limitation. In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

Incorporation By Reference

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

Exemplary Embodiments

Various techniques of distributing revenue and/or other money are providing herein. One embodiment includes a method of distributing portions of loan payments to one or more referrers associated with one or more loans.

Figure 2:
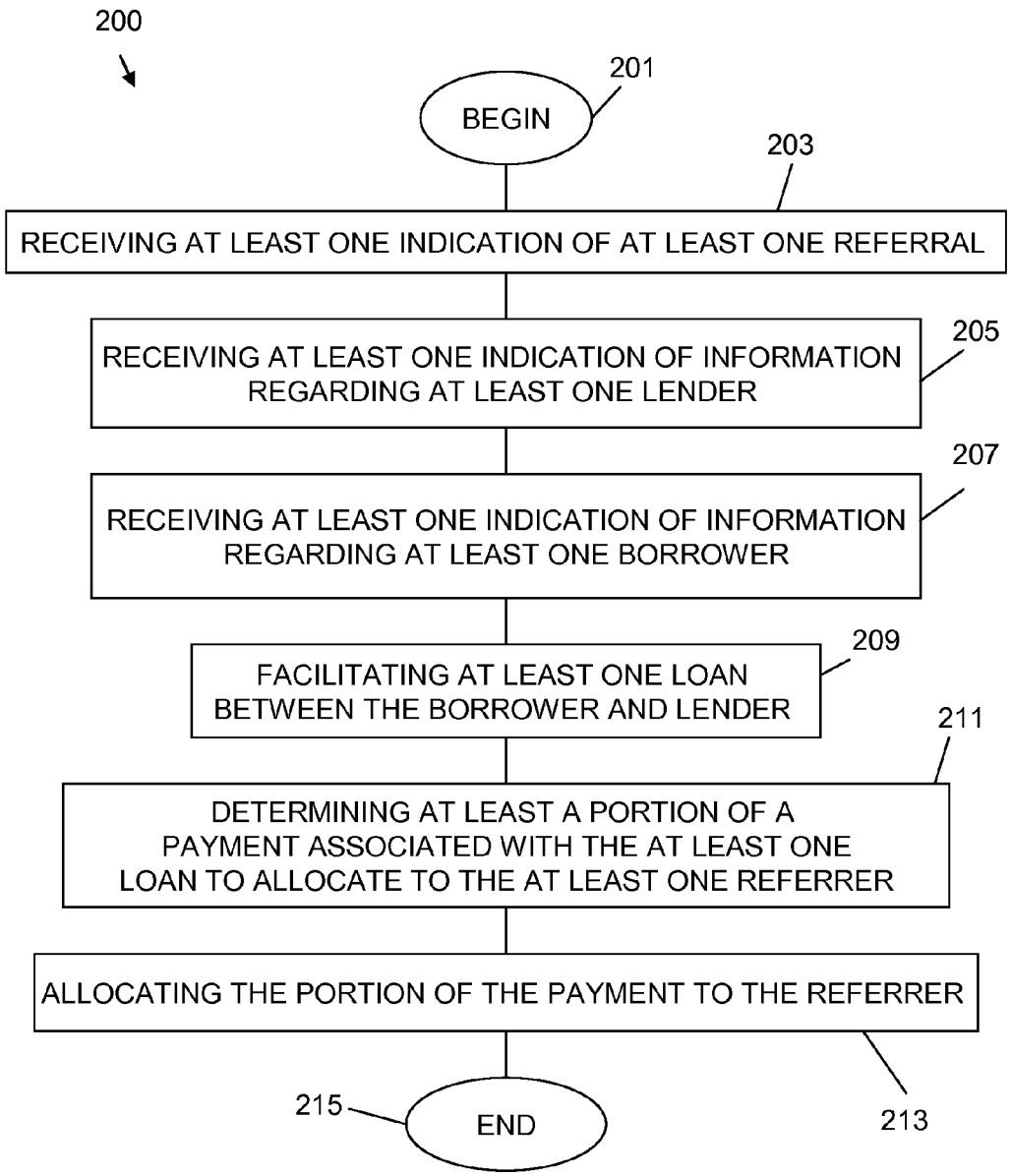
FIG. 2 shows an example process that may be performed in accordance with some embodiments.

As mentioned above, one embodiment includes a method of distributing parts of a loan payment to one or more referrers associated with the loans. In one particular embodiment, a computer system, for example, may implement a process similar to process 200 illustrated in FIG. 2. Process 200 may begin at block 201.

As indicated at block 203, process 200 may include receiving at least one indication of at least one referral. In some embodiments, the indication of the referral may include an indication that a referrer has referred at least one borrower. In some implementations, a plurality of indications each indicating that a respective referrer has referred at least one respective borrower may be received. In some implementations, an indication of a referral may include, for example, a loan application identifying a referrer, and/or any other information in any format. In some embodiments, the indication of the referral may include an indication that a referrer has referred at least one lender. In some implementations, a plurality of indications each indicating that a respective referrer has referred at least one respective lender may be received.

In some embodiments, each indication of a referral may indicate a referrer. In some implementations, a referrer may include at least one of an individual, a referring webpage (e.g., a webpage that redirects a user to a webpage for entering lender/borrower information), an organization, and/or any other entity. Some examples of indications of referrals are mentioned above, other non-limiting examples may include electronic messages, temporary internet browser storage (e.g., cookies), a URL (e.g., referrer.placereferredto.com), and/or any other type of indication.

As indicated at block 205, process 200 may include receiving at least one indication of information regarding at least one lender. Some implementations may include receiving a plurality of indications of respective information regarding a plurality of respective lenders. Some implementations may include providing a user interface (e.g., a web site) through which a lender may enter such information. The lender may include, for example, a bank or other financial institution, a private individual, and/or any other individual or entity. In some implementations, such information may include identification information such as names, contact information, and/or any other identifying information desired. In some implementations, such information may include lending information such as one or more interest rates at which loans may be lent, one or more amounts of money that may be lent, one or more lending restrictions or policies, and/or any other desired lending information. In some implementations, receiving such information may occur substantially simultaneously with receiving an indication of a referrer of a lender as described above. For example, a lender may enter referrer information through a user interface and submit such information as one or more electronic messages that include both an indication of the information and an indication of the referral.

As indicated at block 207, process 200 may include receiving at least one indication of information regarding at least one borrower. Some implementations may include receiving a plurality of indications of respective information regarding a plurality of respective borrowers. The borrowers may include individuals, business entities, and/or any other desired borrowers. In some implementations, such information may include, for example, identification information such as a name, social security number, contact information, and/or any other identifying information. In some implementations, such information may include borrowing information such as one or more desired interest rates, one or more desired amounts of money to borrow, one or more credit related details (e.g., credit rating, income, etc.), one or more desired terms, and/or any other desired information. In some implementations, receiving such information may occur substantially simultaneously with receiving an indication of a referrer of a borrower as described above. For example, a borrower may enter referrer information through a user interface and submit such information as one or more electronic messages that include both an indication of the information and an indication of the referral.

As indicated at block 209, process 200 may include facilitating at least one loan. The loan may include a loan of money from at least one lender (e.g., a lender about whom an indication of information is received at block 205) to at least one borrower (e.g., a borrower about whom an indication of information is received at block 207). In some implementations, the at least one loan may include a plurality of loans. In some implementations, facilitating may include matching at least one lender with at least one borrower based on the respective received indications of information. For example, in some implementations, a lender willing to provide a loan at a particular interest rate may be matched with a borrower willing to take a loan at or near that interest rate. In some implementations, other information such as terms, amounts of money, credit worthiness, and/or any other desired items may be matched as well or as an alternative to interest rates.

In some implementations, a plurality of lenders may be matched to a single borrower. In others, a single lender may be matched to a single borrower. Such a matching may, in some implementations, include the lender and borrower with most similar information. In some implementations, a representation of one or more lenders may be provided to a borrower. The representation may include, for example, a user interface through which the borrower may view information about available loans from the one or more lenders and/or may select one or more of the matched one or more lenders from the representation to accept a loan or loans. In some implementations, such matches may be ordered based on similarity of information.

In some implementations, facilitating may include providing a representation of one or more borrowers to one or more lenders. The representation may include, for example, a user interface through which the one or more lenders may view information regarding the one or more borrowers. In some implementations, the representation may include a sorted list of borrowers according to closeness of match.

In some implementations, information may be exchanged with/provided to respective borrowers and/or lenders so that a loan may be established between them. In other implementations, a loan may automatically be established if information regarding a lender and a borrower matches to a sufficient degree. In still other implementations, a loan may be established if one or both parties verifies their desire for a loan (e.g., through a web page or other user interface, by signing a loan document electronically or by hand, etc.).

As indicated at block 211, process 200 may include determining at least a portion of a payment associated with the one or more loans to allocate to the at least one referrer. In various embodiments, such a portion may be determined for all loans given to a referred borrower and/or by a referred lender. In some implementations, such a portion may include a portion of a repayment of a principal of the loan, a payment of interest in the loan, a payment of a fee associated with the loan, and/or any other payment.

As indicated at block 213, process 200 may include allocating the portion of the payment to the referrer. In some implementation, process 200 may further include providing the payment to the referrer. A referrer may thereby receive a payment for each loan in which a party to the loan was referred by him or her.

Process 215 may end at block 215. It should be understood that process 200 may include some described acts in any order and that other embodiments may include other non-described acts and/or may not include some or all described acts. It should further be understood that some acts may be performed simultaneously as a single act rather than separate acts in some implementations.

Figure 3:
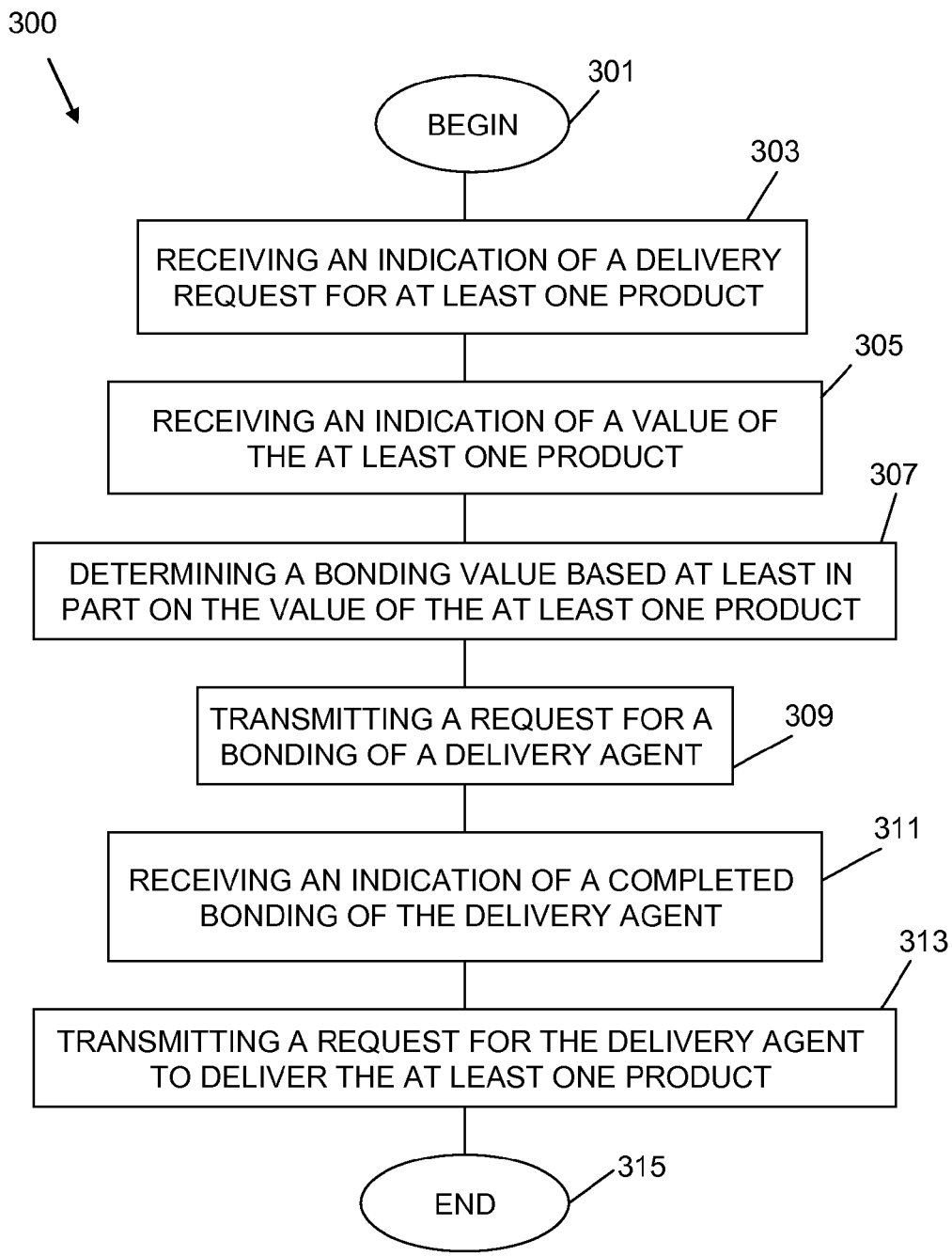
FIG. 3 shows another example process that may be performed in accordance with some embodiments.

Another embodiment of the present invention relates to bonding of delivery agents. In one particular embodiment, a computer system, for example, may implement a process similar to process 300 illustrated in FIG. 3. Process 300 may begin at block 301.

As indicated at block 303, some embodiments of process 300 may include receiving an indication of a delivery request for at least one product. In some implementations, the indication of the delivery request may include an indication of the at least one product, an indication of a source of the at least one product, an indication of a destination for the at least one product, an indication of a desired delivery agent, and/or any other desired information. In some implementations, the indication may be received from a source of the at least one product (e.g., a merchant) a destination of the at least one product (e.g., a customer), and/or any other entity.

As indicated at block 305, some embodiments of process 300 may include receiving an indication of a value of the at least one product. In some implementations, the value may include an estimated value of the product, a cost of the product, and/or any other value. In some implementation the indication of the value may be received with and/or substantially simultaneously to the indication of the delivery request (e.g., in a same one or more electronic messages). In some implementations, the indication of the value may be received from the source of the product, the destination of the product, and/or any other source.

As indicated at block 307, some embodiments of process 300 may include determining a bonding value based at least in part on the value of the at least one product. In some implementations, the bonding value may include a percentage of the value of the product (e.g., 10%). Determining a bonding value may include determining the amount of money equal to such a percentage. In some implementations, a bonding value may vary based on other criteria such as distance, fragility, risk adversity of source/destination, and/or any other information.

As indicated at block 309, some embodiments of process 300 may include transmitting a request for a bonding of a delivery agent. In some implementations, the request may include a request to bond the agent with at least an amount of money equal to the determined bonding value. In some implementations, the request may be transmitted as an electronic message (e.g., an email message, a credit card charge, etc.). In other implementations, the request may be a verbal or other type of request. The request may be transmitted to the delivery agent, a financial institution associated with a delivery agent, and/or any other entity.

As indicated at block 311, some embodiments of process 300 may include receiving an indication of a completed bonding of the delivery agent. Such an indication may include an indication that the bonding value has been received or otherwise reserved. For example, in some implementations, such an indication may include an indication from a credit card company, bank and/or other financial institution or individual that an amount of money equal to the bonding value has been reserved (e.g., locked on a credit card, etc.). In other implementations the indication may include an indication that the amount of money has been received, for example, by an entity performing the process, a trusted entity, and/or any other entity. In some implementation at least part of the bonding amount may be returned to its source of the bonding amount after delivery is successfully completed.

As indicated at block 313, some embodiments of process 300 may include transmitting a request for the delivery agent to deliver the at least one product. In some implementations the request may include a request to act as an agent when delivering the product to the destination. In some implementations, acting as an agent may include accepting the product from the source without taking ownership of the product. In some implementations, the request may include a request to act as a principal when delivering the product. In some implementations, acting as a principal may include accepting the product from the source and taking ownership of the product until delivery is complete.

In some implementations process 300 may include an act of delivering at least one product from at least one source to at least one destination. Delivering the product may include acting as an identified one of an agent and/or a principal.

Process 300 may end at block 315. It should be understood that process 300 may include some described acts in any order and that other embodiments may include other non-described acts and/or may not include some or all described acts. It should further be understood that some acts may be performed simultaneously as a single act rather than separate acts in some implementations.

Figure 4:
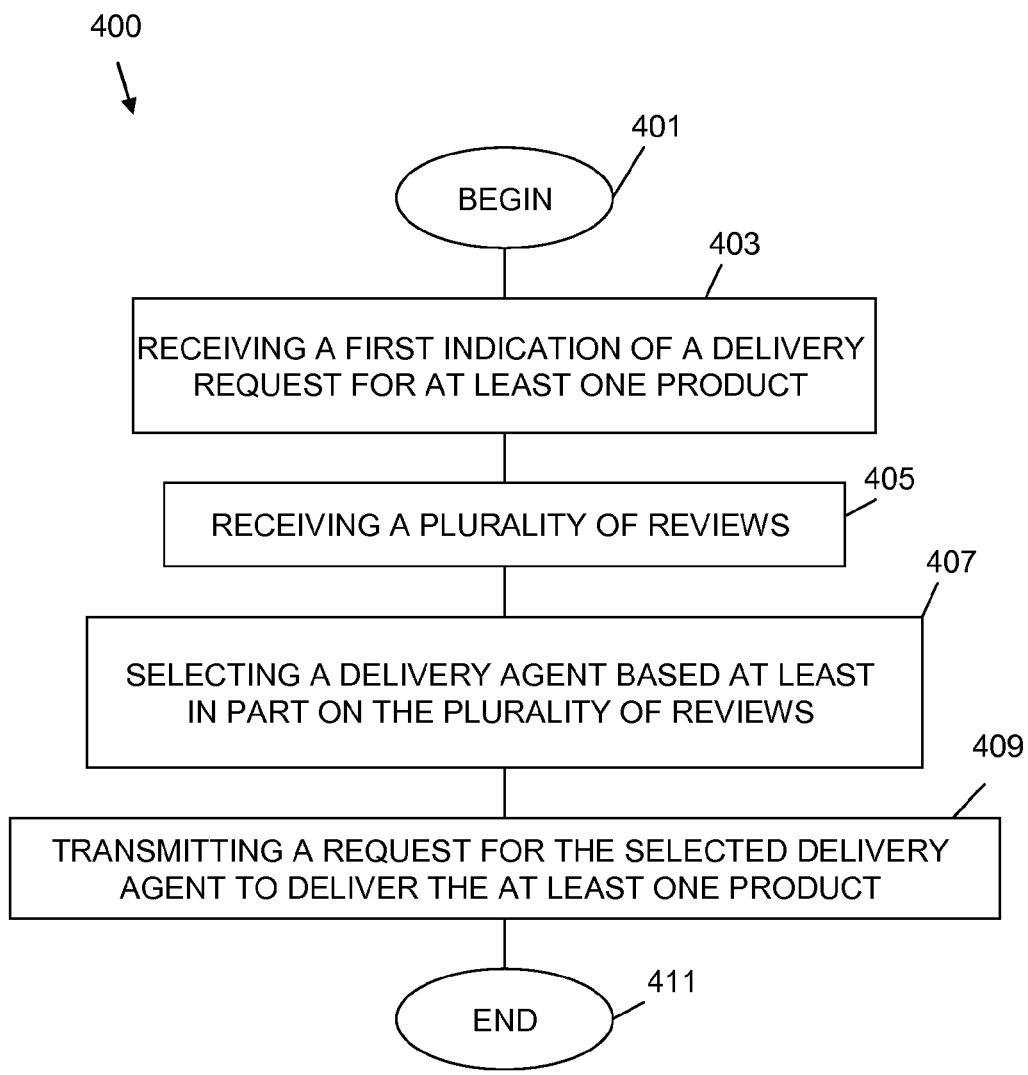
FIG. 4 shows yet another example process that may be performed in accordance with some embodiments.

Another embodiment of the present invention relates to selecting delivery agents. In one particular embodiment, a computer system, for example, may implement a process similar to process 400 illustrated in FIG. 4. Process 400 may begin at block 401.

As indicated at block 403, some embodiments of process 400 may include receiving a first indication of a delivery request for at least one product. In some implementations, the indication of the delivery request may include an indication of the at least one product, an indication of a source of the at least one product, an indication of a destination of the at least one product, and/or any other desired information. In some implementations, the indication may be received from a source of the at least one product (e.g., a merchant), a destination of the at least one product (e.g., a customer), and/or any other entity.

As indicated at block 405, some embodiments of process 400 may include receiving a plurality of reviews. In some implementations, the reviews may include one or more of an opinion, a fact, and/or any other information regarding one or more delivery agents. For example, a review may include a rating, a positive/negative story, a time needed for delivery, and/or any other type of information. In some implementations reviews may be received from a plurality of sources such as people that have used a reviewed delivery agent in the past.

As indicated at block 407, some embodiments of process 400 may include selecting a delivery agent based at least in part on the plurality of reviews. Selecting may include determining which delivery agent delivers to a particular destination, determining which delivery agent is willing/able to deliver within a particular timeframe, and/or matching information regarding a delivery agent with information about a particular delivery (e.g., type/size of delivered product, time of delivery, location of delivery source or destination, etc.). In some implementations, selecting may include selecting a delivery agent associated with more positive reviews than at least one other delivery agent. In some implementations, selecting a delivery agent may include selecting a most favorably reviewed delivery agent. In some implementations, a user may be presented with a list of delivery agents and asked to select one from the list. The list of delivery agents may be determined based, at least in part, on the plurality of reviews (e.g., ordered based on favorable ratings, etc.). In one implementation, a set of reviews may be filtered based on a social network (e.g., of source, destination, etc.) of the source and/or destination of the delivery before determining a selected delivery agent.

As indicated at block 409, some embodiments of process 400 may include transmitting a request for the selected delivery agent to deliver the at least one product. In some implementations the request may include a request to act as an agent when delivering the product to the destination. In some implementations, acting as an agent may include accepting the product from the source without taking ownership of the product during delivery. In some implementations, the request may include a request to act as a principal when delivering the product. In some implementations, acting as a principal may include accepting the product from the source and taking ownership of the product during delivery.

In some implementations process 400 may include an act of delivering the product to the destination. Delivering the product may include acting as an identified one of an agent and/or a principal.

Process 400 may end at block 411. It should be understood that process 400 may include some described acts in any order and that other embodiments may include other non-described acts and/or may not include some or all described acts. It should further be understood that some acts may be performed simultaneously as a single act rather than separate acts in some implementations.

Figure 5:
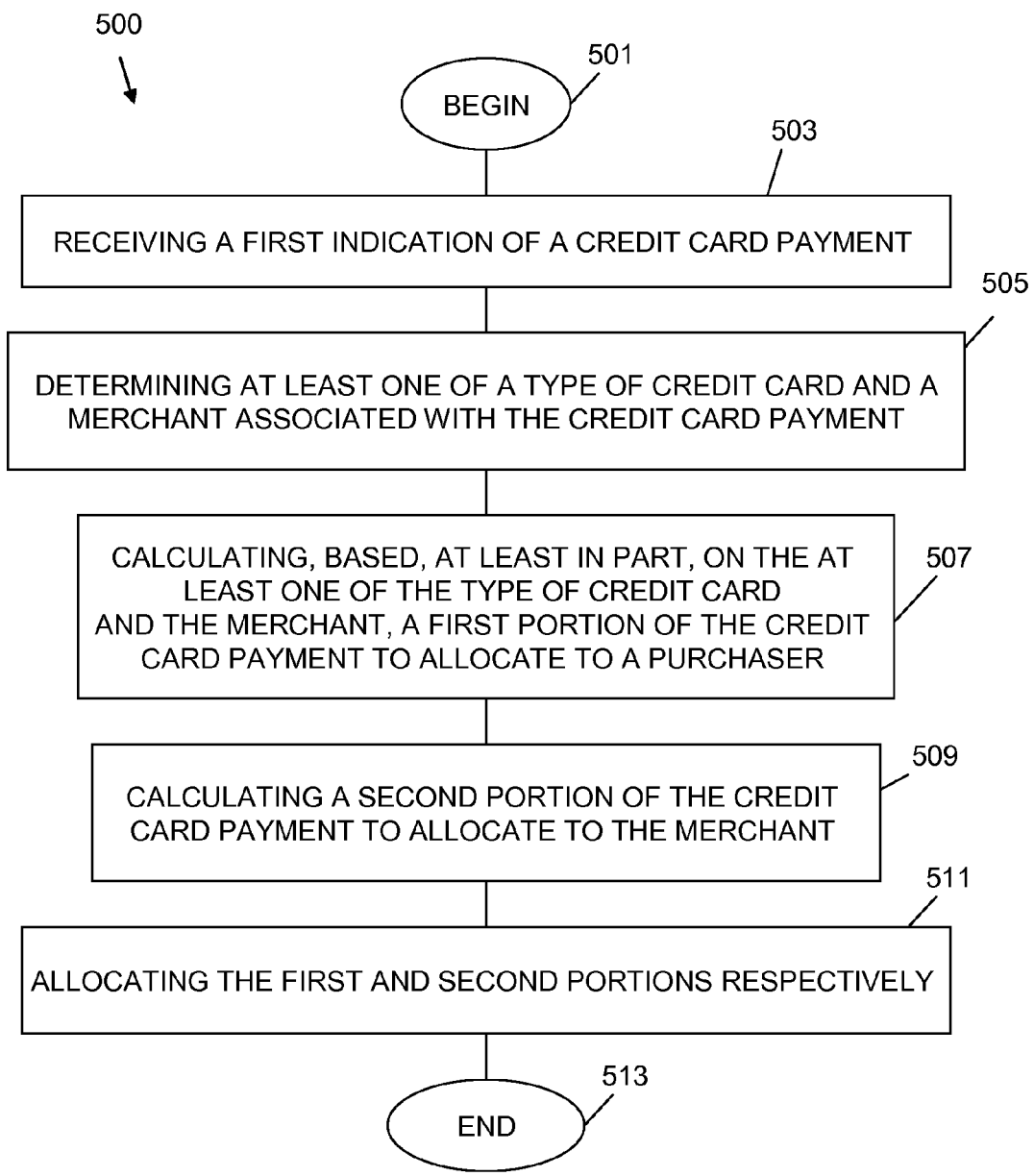
FIG. 5 shows still another example process that may be performed in accordance with some embodiments.

Still other embodiments of the present invention relate to allocating portions of credit card payments. In one particular embodiment, one or more computer systems, for example, may implement a process similar to process 500 illustrated in FIG. 5. Process 500 may begin at block 501.

As indicated at block 503, some embodiments of process 500 may include receiving a first indication of a credit card payment. The indication may be received, for example by a merchant, a credit card company, or any other desired entity. The indication may include credit card information identifying a credit card, payment information identifying a payment to be made to the credit card, authorization information authorizing the payment to be made to the credit card, and/or any other desired information.

As indicated at block 505, some embodiments of process 500 may include determining at least one of a type of credit card and a merchant associated with the credit card payment. In some implementations, the merchant may receive the indication so that determining the merchant may be substantially trivial. In other implementations a credit card company or other entity may receive the indication. In such embodiments, determining the merchant may include inspecting the received indication of the credit card payment. In some implementations, determining the type of the credit card may include determining if the credit card matches one or more desired types of credit cards. For example, determining the type may include determining if the credit card is a proprietary type or other promotional type associated with merchant, credit card company, and/or other desired entity. For example, in some implementations, a merchant may receive an indication of a payment and determine if a credit card used to make the payment is a type issued by the merchant or involved in some other promotion. In other implementations, a credit card company may receive an indication of a payment and determine if the merchant is an issuer of the credit card, or otherwise related to the credit card (e.g., through a promotion).

As indicated at block 507, some embodiments of process 500 may include calculating, based, at least in part, on the at least one of the type of credit card and the merchant, a first portion of the credit card payment to allocate to a purchaser. For example, if the merchant is an issuer of the card or otherwise associated/matched with the card type, the first portion may be allocated to the purchaser. Otherwise, the first portion may not be allocated to the purchaser. In some implementations, the first portion may include a percentage of the payment. In some implementations, the percentage of the payment allocated may vary with a value of the purchase, a characteristic of the purchaser, and/or any other criteria. In some implementations, process 500 may include offering a product or service for sale at an amount included in the payment. In some implementations, the sale amount may include a merchant portion and a fee portion. The merchant portion may include an amount that a merchant sells a product and/or service for. A fee portion may include a fee for offering the product and/or service for sale and/or delivering. In some implementations, the sale amount may be an amount that the merchant typically sells the product or service for, and the merchant portion may represent a discounted price that a reseller or other agent may use to sell the product (e.g., in combination with the fee portion). The fee portion may represent a markup to the merchant portion that may return the merchant portion to the sale amount. In some implementations, the first portion may include such a fee portion and/or merchant portion.

As indicated at block 509, some embodiments of process 500 may include calculating a second portion of the credit card payment to allocate to the merchant. The second portion, in some implementations, may include some or all of the remainder of the payment. In some implementations, a portion of the payment may be calculated to be allocated to other entities, for use to pay fees, and/or for other purposes. In some implementations, the second portion may include a fee portion and/or merchant portion.

As indicated at block 511, some embodiments of process 500 may include allocating the first and second portions respectively. In some implementations, process 500 may further include providing the allocated portions to the respective merchant and purchaser.

Process 500 may end at block 513. It should be understood that process 500 may include some described acts in any order and that other embodiments may include other non-described acts and/or may not include some or all described acts. It should further be understood that some acts may be performed simultaneously as a single act rather than separate acts in some implementations. Furthermore, while process 500 is described in terms of credit cards, it should be understood that other payment methods and credit methods may be used in various other embodiments.

Figure 6:
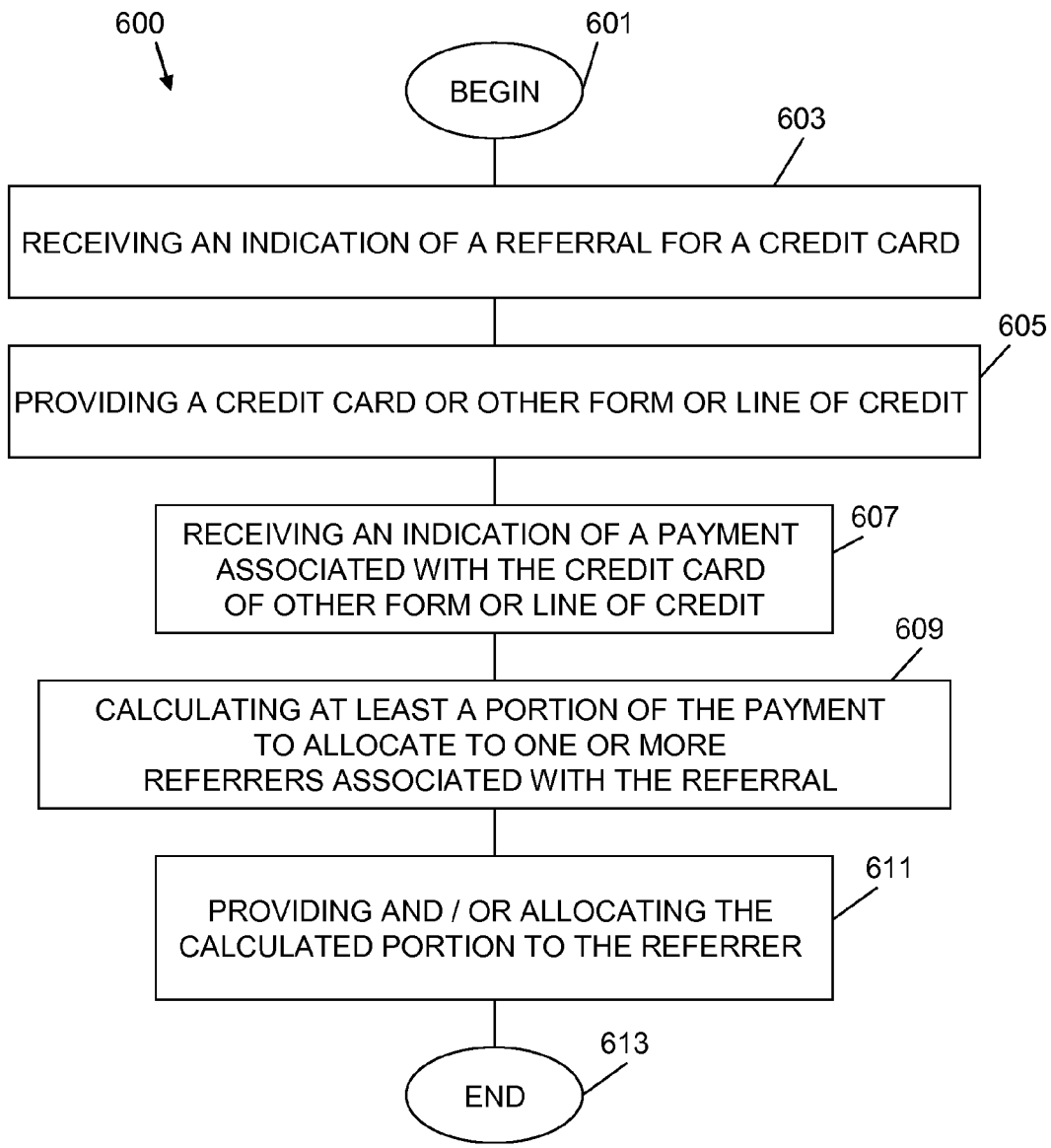
FIG. 6 shows a further example process that may be performed in accordance with some embodiments.

In some embodiments, one or more computer systems, for example, may implement a process similar to process 600 illustrated in FIG. 6. Process 600 may begin at block 601.

As indicated at block 603, some embodiments may include receiving an indication of a referral for a credit card. In some implementations, such an indication may include any type of indication that a person has been referred to obtain a credit card from one or more credit card issuers. In some implementations, such an indication may include, for example, a credit card application that identifies a referrer, a URL that indicates a source of a referral (e.g., source.issuer.com), a cookie or other storage element associated with an internet browser, and/or any other type of electronic message or other indication. In some implementations, the indication may be received from a referrer and/or a subject of the referral.

In some implementations, process 600 may include providing a credit card or other form or line of credit, as indicated at block 605. For example, in some implementations, a credit card issuer may perform some or all of the actions of process 600. In response to receiving an indication of a referral for a credit card, a credit card may be provided to the subject of the referral (e.g., a person or entity being referred) by such a credit card issuer. In some implementations, a verification process and/or various credit processing acts (e.g., credit check) may be performed before issuing a credit card. Such acts are well known in the credit business.

As indicated at block 607, process 600 may include receiving an indication of a payment associated with the credit card. A payment for example, may include a payment of a principal balance on the credit card, a payment of interest of a balance on the credit card, and/or a payment of a fee associated with the credit card. Such a payment may be associated with use of the credit card, for example, to purchase one or more products or services by the subject of the referral.

As indicated at block 609, some embodiments may include calculating at least a portion of the payment to allocate to one or more referrers associated with the referral. Such a referrer may include an individual or entity identified by the indication of the referral as having referred the subject of the referral. In some implementations, a percentage of the payment or some part of the payment may be calculated for allocation. In some implementations, such a percentage may vary, for example in accordance with a size of the payment, amount of interest charged, number of people referred by the referrer, and/or any other criteria. In some implementations, calculating at least the portion of the payment may include calculating a portion of an interest part of the payment, a principal part of the payment, a fee part of the payment, and/or any other desired part for allocation to the referrer.

As indicated at block 611, some embodiments of process 600 may include providing and/or allocating the calculated portion to the referrer. Providing may include delivering money in any form to a referrer and/or delivering a credit of any type to the referrer.

Process 600 may end at block 613. It should be understood that process 600 may include some described acts in any order and that other embodiments may include other non-described acts and/or may not include some or all described acts. It should further be understood that some acts may be performed simultaneously as a single act rather than separate acts in some implementations. Furthermore, while process 600 is described in terms of credit cards, it should be understood that other payment methods and credit methods may be used in various other embodiments.

Figure 7:
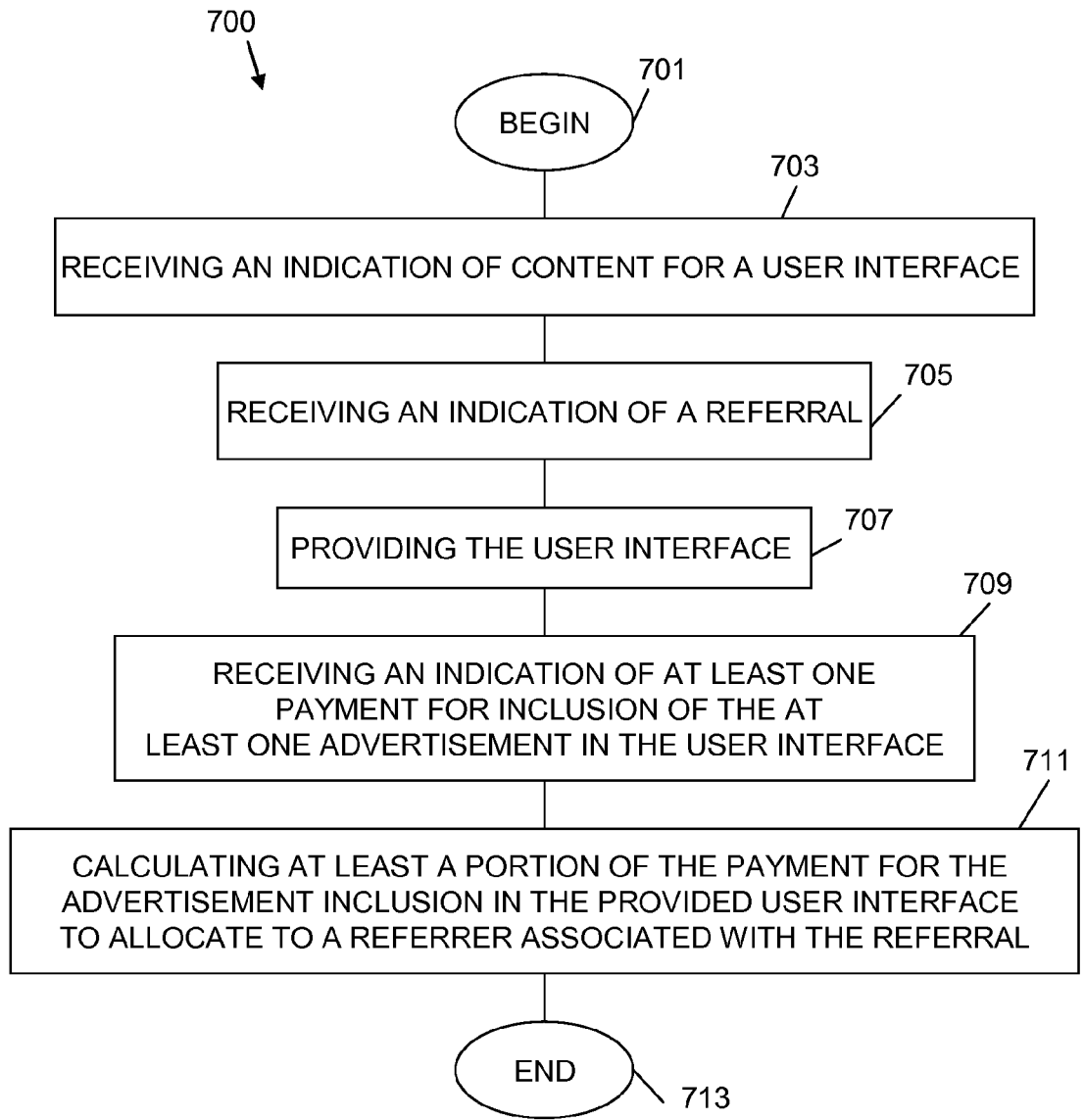
FIG. 7 shows a still further example process that may be performed in accordance with some embodiments.

Yet another embodiment of the present invention relates to sharing advertisement revenue with various entities. For example, FIG. 7 illustrates an example process 700 that may be performed, for example, by one or more computer systems. Process 700 may begin at block 701.

In some implementations, not indicated in FIG. 7, process 700 may include receiving a representation of the advertisement. The representation of the advertisement, for example, may be received from an advertiser. In some implementations, an advertisement plan may also be received. The advertisement plan may indicate when to include the advertisement in a user interface, a price paid for insertion of the advertisement, and/or any other advertising information associated with the advisement. In some implementations, an advertisement may include, for example, a popup window, a website link, an image, textual information, audio information, video information, and/or any other desired information.

As indicated at block 703, process 700 may include receiving an indication of content for a user interface. The content, for example, may include information that may be present through a typical user interface (e.g., a web page, mobile device interface, etc.). In some implementations, the content may include menu information, product information, service information, and/or any other information. The content may be received, for example, from a subject of the information (e.g., a restaurant may provide menu information, etc.), or other sources (e.g., customers may provide menu information, reviews, etc.).

As indicated at block 705, process 700 may include receiving an indication of a referral. The indication of the referral may take any desired form. In some implementations, for example, an indication of the referral may include an electronic message. Some example indications may include a URL e.g., source.ui.com, a cookie stored by a web browser, and/or a direct identification by a user of a reference to the user interface.

The referral may include a referral of a user to the user interface in some implementations. The referral may alternatively or additionally include a referral of a content provider associated with the user interface (e.g., a restaurant to a delivery web site), a referral of an advertiser, and/or any other entity to the user interface.

As indicated at block 707, process 700 may include providing the user interface. In some implementations, the user interface may include one or more advertisements. In some implementations, the user interface may include a web page presented through an internet browser, a mobile device interface, and/or any other user interface. The user interface may include any information, such as information that may typically be presented through a web page, mobile device interface and/or any other user interface. In some implementations, the user interface may include a user interface for a delivery service through which a user may enter information requesting delivery of products and/or services. In some implementations, process 700 may include receiving a request for the interface, such as a request from a web browser. In some implementations, presenting a user interface may include transmitting one or more electronic messages.

In some embodiments, as indicated at block 709, process 700 may include receiving an indication of at least one payment for inclusion of the at least one advertisement in the user interface. The indication of the payment, for example, may be received from the advertiser in accordance with an advertisement plan or other agreement with the advertiser. In some implementations, the payment may be associated with the advertisement on a pay per view basis, a pay per click basis, and/or any other desired basis.

As indicated at block 711, process 700 may include calculating at least a portion of the payment for the advertisement inclusion in the provided user interface to allocate to at least one of the referrers. The referrer may include the referrer of a user to the user interface, a referrer associated with content of the user interface, a referrer of the advertiser associated with the advertisement, and/or any other referrer. In some implementations, calculating may include determining a percentage of the payment. In some implementations, the percentage may vary, for example based on an amount of the payment, a basis for payment, a number of references, a type of the subject of the referral, and/or any other desired criteria.

Process 700 may end at block 713. It should be understood that process 700 may include some described acts in any order and that other embodiments may include other non-described acts and/or may not include some or all described acts. It should further be understood that some acts may be performed simultaneously as a single act rather than separate acts in some implementations.

The above described processes are provided as non-limiting examples of embodiments of the present invention. It should be understood that other embodiments may include other acts and techniques for sharing money, bonding and/or selecting delivery agents, and any other desired result.

More Embodiments

A method comprising receiving a first indication of a first information regarding at least one lender; receiving a plurality of second indications, each of the plurality of second indications indicating a respective second information regarding at least one of a plurality of borrowers; and determining at least a portion of payments associated with a plurality of loans from the at least one lender to the plurality of borrowers to allocate to at least one referrer, wherein each loan of the plurality of loans includes a loan from the at least one lender to a respective one of the plurality of borrowers.

The method wherein the at least one referrer includes a referrer of the at least one lender.

The method further comprising receiving at least one indication of a referral of the at least one lender.

The method in which the at least one indication of the referral includes at least one electronic message.

The method wherein the indication of the referral includes an identification of the referrer by the at least one lender.

The method wherein the indication of the referral includes content of a temporary storage element of an Internet browser.

The method wherein the indication of the referral includes a universal resource locator.

The method wherein the at least one referrer includes a referrer of at least one borrower of the plurality of borrowers.

The method further comprising receiving at least one indication of a referral of the at least one borrower of the plurality of borrowers.

The method in which the at least one indication of the referral includes at least one electronic message.

The method wherein the indication of the referral includes an identification of the referrer by the at least one borrower.

The method wherein the indication of the referral includes at least one loan application.

The method wherein the indication of the referral includes content of a temporary storage element of an Internet browser.

The method wherein the indication of the referral includes a universal resource locator.

The method wherein the first information includes an offered interest rate by the at least one lender.

The method wherein the first information includes at least one of an amount of money to be loaned, a loan term, and a loan restrictions.

The method wherein the at least one lender includes at least one financial institution.

The method wherein each respective second information includes a desired interest rate of at least one respective borrower of the plurality of borrowers.

The method wherein the second information includes at least one of an amount of money to be borrowed, a desired loan term, and credit information.

The method wherein the portion includes a percentage of the payments.

The method wherein the payments includes at least one of a payment of interest, a payment of principal, and a payment of a fee.

The method wherein the percentage is based, at least in part, on whether a referee of the referrer is one of the at least one lender or one of the plurality of borrowers.

The method further comprising receiving the payments and providing the portion of the payments to the at least one referrer.

The method further comprising transmitting a representation of the portion of the payments.

The method further comprising facilitating the plurality of loans.

The method wherein facilitating includes providing at least a portion of the first information to each borrower of the plurality of borrowers.

The method wherein facilitating includes providing at least a portion of the second information to the at least one lender.

The method wherein facilitating includes providing at least one user interface that includes at least one of the first information and the second information.

The method wherein facilitating includes matching each borrower of the plurality of borrowers with the at least one lender based, at least in part, on at least one of the first information and the second information.

An apparatus comprising at least one machine readable medium, the at least one machine readable medium having stored thereon a plurality of machine instructions, the plurality of machine instructions together being able to control at least one computer system to perform a method.

The apparatus further comprising at least one processor configured to execute at least one instruction of the plurality of machine instructions.

A method comprising receiving first information regarding at least one lender; receiving second information regarding at least one borrower; and determining at least a portion of a payment associated with at least one loan from the at least one lender to the at least one borrower to allocate to at least one referrer.

The method wherein the referrer includes a referrer of the at least one lender.

The method further comprising receiving at least one indication of a referral of the at least one lender.

The method in which the at least one indication of the referral includes at least one electronic message.

The method wherein the indication of the referral includes an identification of the referrer by the at least one lender.

The method wherein the indication of the referral includes content of a temporary storage element of an Internet browser.

The method wherein the indication of the referral includes a universal resource locator.

The method wherein the referrer includes a referrer of the at least one borrower.

The method further comprising receiving at least one indication of a referral of the at least one borrower.

The method in which the at least one indication of the referral includes at least one electronic message.

The method wherein the indication of the referral includes an identification of the referrer by the at least one borrower.

The method wherein the indication of the referral includes at least one loan application.

The method wherein the indication of the referral includes content of a temporary storage element of an Internet browser.

The method wherein the indication of the referral includes a universal resource locator.

The method wherein the first information includes an offered interest rate by the at least one lender.

The method wherein the first information includes at least one of an amount of money to be loaned, a loan term, and a loan restrictions.

The method wherein the at least one lender includes at least one financial institution.

The method wherein the second information includes a desired interest rate of the at least one borrower.

The method wherein the second information includes at least one of an amount of money to be borrowed, a desired loan term, and credit information.

The method wherein the portion includes a percentage of the payment.

The method wherein the payment includes at least one of a payment of interest, a payment of principal, and a payment of a fee.

The method wherein the percentage is based, at least in part, on whether a referee of the referrer is one of the at least one lender or one of the at least one borrower.

The method further comprising receiving the payment and providing the portion to the at least one referrer.

The method further comprising transmitting a representation of the portion.

The method further comprising facilitating the at least one loan.

The method wherein facilitating includes providing at least a portion of the first information to the at least one borrower.

The method wherein facilitating includes providing at least a portion of the second information to the at least one lender.

The method wherein facilitating includes providing at least one user interface that includes at least one of the first information and the second information.

The method wherein facilitating includes matching the at least one borrower with the at least one lender based, at least in part, on at least one of the first information and the second information.

An apparatus comprising at least one machine readable medium, the at least one machine readable medium having stored thereon a plurality of machine instructions, the plurality of machine instructions together being able to control at least one computer system to perform a method.

The apparatus further comprising at least one processor configured to execute at least one instruction of the plurality of machine instructions.

A method comprising receiving a request for a delivery of at least one product; receiving an indication of a value of the at least one product; transmitting a request for a bonding of a delivery agent, a value of the request for the bonding being based, at least in part, on the value of the at least one product; receiving an indication that a sum of money at least as great as the value of the request for the bonding is available to bond the delivery agent; transmitting, to the delivery agent, a request to deliver the at least one product.

The method wherein transmitting the request for the bonding includes transmitting a request to lock a charge on at least one credit card, a value of the charge corresponding to a value of the request for the bonding.

The method wherein receiving the indication that the sum of money at least as great as the value of the request for the bonding is available includes receiving an indication that the charge has been successfully locked on the at least one credit card.

The method wherein receiving an indication that the sum of money at least as great as the value of the request for the bonding is available includes at least one of receiving an indication that the money is held by a trusted entity, and receiving the money.

The method wherein the request to deliver the at least one product includes a request to act as a principal when delivering the at least one product.

The method wherein acting as a principal includes paying at least one merchant for the at least one product in order to take ownership of the at least one product during the delivery of the at least one product; and transferring ownership of the at least one product to at least one customer upon delivery of the at least one product.

The method wherein the request to deliver the at least one product includes a request to act as an agent when delivering the at least one product.

The method wherein acting as an agent includes taking possession of the at least one product from at least one merchant without paying the at least one merchant to take ownership of the at least one product during the delivery of the at least one product; and transferring possession of the at least one product to at least one customer upon delivery of the at least one product.

The method further comprising delivering the at least one product.

The method wherein the request for the delivery includes a request to deliver the at least one product from a merchant to a customer.

The method wherein the value of the request includes at least a percentage of the value of the at least one product.

An apparatus comprising at least one machine readable medium, the at least one machine readable medium having stored thereon a plurality of machine instructions, the plurality of machine instructions together being able to control at least one computer system to perform a method.

The apparatus further comprising at least one processor configured to execute at least one instruction of the plurality of machine instructions.

A method comprising receiving a request for a delivery of at least one product; receiving a plurality of reviews, each review of the plurality of reviews corresponding to a respective one of a plurality of delivery agents; selecting at least one delivery agent from the plurality of delivery agents, based, at least in part, on at least one of the plurality of reviews; and transmitting, to the at least one delivery agent, a request to deliver the at least one product.

The method wherein each review of the plurality of reviews includes at least one of a fact and an opinion regarding a respective one of the plurality of delivery agents.

The method wherein each review is received from a user of a respective one of the plurality of delivery agents.

The method wherein the request to deliver the at least one product includes a request to act as a principal when delivering the at least one product.

The method wherein acting as a principal includes paying at least one merchant for the at least one product in order to take ownership of the at least one product during the delivery of the at least one product; and transferring ownership of the at least one product to at least one customer upon delivery of the at least one product.

The method wherein the request to deliver the at least one product includes a request to act as an agent when delivering the at least one product.

The method wherein acting as an agent includes taking possession of the at least one product from at least one merchant without paying the at least one merchant to take ownership of the at least one product during the delivery of the at least one product; and transferring possession of the at least one product to at least one customer upon delivery of the at least one product.

The method wherein the request for delivery includes a request to deliver a product from a merchant to a customer.

The method wherein selecting the at least one delivery agent includes selecting a relatively positively reviewed delivery agent.

The method wherein selecting the relatively positively reviewed delivery agent includes selecting an available delivery agent.

The method wherein the available delivery agent is willing to delivery the at least one product from a merchant to a customer within a desired timeframe.

The method wherein selecting the relatively positively reviewed delivery agent includes selecting a most positively reviewed delivery agent of the plurality of delivery agents.

The method further comprising filtering the reviews before selecting the delivery agent.

The method wherein filtering the reviews includes filtering the reviews based at least on one of a social network of a merchant, and a social network of a recipient.

An apparatus comprising at least one machine readable medium, the at least one machine readable medium having stored thereon a plurality of machine instructions, the plurality of machine instructions together being able to control at least one computer system to perform a method.

The apparatus further comprising at least one processor configured to execute at least one instruction of the plurality of machine instructions.

A method comprising receiving an indication of a credit card payment; determining at least one of a type of a credit card and a merchant associated with the credit card payment; calculating, based, at least in part, on the at least one of the type of the credit card and the merchant, at least a first portion of the credit card payment to allocate to a purchaser associated with the credit card payment; and calculating at least a second portion of the credit card payment to allocate to the merchant associated with the credit card payment.

The method further comprising offering at least one of a product and a service from the merchant; receiving an indication of a purchase of the at least one of the product and the service, wherein the credit card payment includes a payment for the at least one of the product and the service.

The method wherein offering the at least one of the product and the service includes indicating at least one price for the at least one of the product and the service, the at least one price being a normal price at which the at least one of the product and the service is offered by the at least one merchant, and wherein the at least one price includes a merchant portion and a fee portion.

The method wherein the second portion includes the merchant portion, and the first portion includes at least part of the fee portion.

The method wherein the first portion includes a predetermined percentage of the fee portion.

The method wherein the first portion includes a percentage of the fee portion that varies with a magnitude of the payment.

The method wherein the first portion includes a predetermined percentage of the payment.

The method wherein the first portion includes a percentage of the payment that varies with a magnitude of the payment.

The method determining if the type of the credit card and the merchant match.

The method wherein determining if the type of the credit card and the merchant match includes determining if the merchant is an issuer of the credit card.

The method wherein calculating, based, at least in part, on the at least one of the type of the credit card and the merchant, at least the first portion of the credit card payment to allocate to the purchaser associated with the credit card payment includes calculating at least the first portion of the credit card payment to allocate to the purchaser if the type of the credit card and the merchant are determined to match.

The method further comprising allocating the first portion to the purchaser and allocating the second portion to the merchant.

An apparatus comprising at least one machine readable medium, the at least one machine readable medium having stored thereon a plurality of machine instructions, the plurality of machine instructions together being able to control at least one computer system to perform a method.

The apparatus further comprising at least one processor configured to execute at least one instruction of the plurality of machine instructions.

A method comprising receiving an indication of a referral of a credit card; receiving an indication of a payment associated with the credit card; and calculating at least a portion of the payment to allocate to a referrer associated with the referral.

The method wherein the indication of the referral includes an indication that at least one of a person and an entity has referred a customer to a credit card company.

The method wherein the indication of the referral includes an electronic message.

The method wherein the indication of the referral includes an identification of the referrer by the customer.

The method wherein the indication of the referral includes a credit card application.

The method wherein the indication of the referral includes content of a temporary storage element of an Internet browser.

The method wherein the indication of the referral includes a universal resource locator.

The method further comprising providing a credit card to a target associated with the referral.

The method wherein the indication of the payment includes an indication that a monetary amount has been paid to a credit card company.

The method wherein the payment includes at least one of a payment of interest, a payment of principal, and a payment of a fee.

The method allocating the portion of the payment to the referrer associated with the referral.

The method wherein the portion includes a percentage of at least a part the payment.

The method wherein the pat least the part includes at least one of an interest part, a fee part, and a principal part.

The method further comprising providing the portion of the payment to the referrer associated with the referral.

An apparatus comprising at least one machine readable medium, the at least one machine readable medium having stored thereon a plurality of machine instructions, the plurality of machine instructions together being able to control at least one computer system to perform a method.

The apparatus further comprising at least one processor configured to execute at least one instruction of the plurality of machine instructions.

A method comprising providing a user interface, the user interface including at least one advertisement; receiving at least one payment for inclusion of the at least one advertisement; allocating at least a portion of the at least one payment to at least one of a referrer associated with the user interface and a content provider associated with the user interface.

The method wherein the user interface includes a delivery service interface.

The method wherein the referrer includes at least one of a referrer of an advertiser associated with the advertisement, a referrer of a user accessing the user interface, and a referrer of the content provider associated with the user interface.

The method further comprising receiving an indication of a referral of the advertiser.

The method wherein the indication of the referral of the advertiser includes an electronic message.

The method further comprising receiving an indication of a referral of the user accessing the user interface.

The method wherein the indication of the referral includes an electronic message.

The method wherein the indication of the referral includes content of a temporary storage element of an Internet browser.

The method wherein the indication of the referral includes a universal resource locator.

The method further comprising receiving an indication of a referral of the content provider.

The method wherein the indication of the referral of the content provider includes an electronic message.

The method wherein the indication of the referral includes content of a temporary storage element of an Internet browser.

The method wherein the indication of the referral includes a universal resource locator.

The method wherein the content provider includes at least one of a merchant associated with the user interface, a provider of menu information associated with the user interface, a provider of association information associated with the user interface, and a provider of review information associated with the user interface.

The method further comprising receiving an indication of content for the user interface from the content provider.

The method wherein content includes at least a portion of information provided through the user interface.

The method further comprising receiving at least one representation of the at least one advertisement.

The method further comprising providing the portion of the at least one payment to the at least one of the referrer associated with the user interface and the content provider associated with the user interface.

An apparatus comprising at least one machine readable medium, the at least one machine readable medium having stored thereon a plurality of machine instructions, the plurality of machine instructions together being able to control at least one computer system to perform a method.

The apparatus further comprising at least one processor configured to execute at least one instruction of the plurality of machine instructions.

A method comprising receiving an indication of a payment, the payment including a merchant portion and a fee portion; determining at least a portion of the fee portion to allocate to at least one of a payer, a referrer, and a content provider associated with the payment.

The method further comprising offering at least one of a product and a service from a merchant; receiving an indication of a purchase of the at least one of the product and the service, wherein the payment includes a payment for the at least one of the product and the service.

The method wherein offering the at least one of the product and the service includes indicating at least one price for the at least one of the product and the service, the at least one price being a normal price at which the at least one of the product and the service is offered by the at least one merchant, and wherein the at least one price includes the merchant portion and the fee portion.

The method wherein the payer includes a payer of the payment.

The method further comprising determining at least a portion of the merchant portion to allocate to at least one merchant.

The method wherein the at least one payment includes a payment for at least one of a product and a service from the at least one merchant.

The method wherein determining the at least the portion includes determining a percentage of the fee portion.

The method wherein the percentage includes a fixed percentage.

The method wherein the percentage varies with a magnitude of the payment.

The method further comprising allocating at least the portion of the fee portion to the at least one of the payer, the referrer, and the content provider associated with the payment.

The method wherein the referrer includes at least one of a referrer of an advertiser, a referrer of a user accessing a user interface, and a referrer of the content provider.

The method further comprising providing the user interface.

The method wherein the content provider includes a provider of content for the user interface.

The method wherein the content provider includes at least one of a merchant associated with the user interface, a provider of menu information associated with the user interface, a provider of association information associated with the user interface, and a provider of review information associated with the user interface.

The method further comprising receiving an advertisement from the advertiser.

The method further comprising receiving at least one indication of a referral.

The method wherein the indication of the referral identifies the referrer and includes a referral of at least one of a referrer of an advertiser, a referrer of a user accessing a user interface, and a referrer of the content provider.

An apparatus comprising at least one machine readable medium, the at least one machine readable medium having stored thereon a plurality of machine instructions, the plurality of machine instructions together being able to control at least one computer system to perform a method.

The apparatus further comprising at least one processor configured to execute at least one instruction of the plurality of machine instructions.

The invention claimed is:

1. A system comprising:
a memory, having stored thereon, a set of instruction, in which, when executed by a computing device, the set of instructions cause the computing device to perform a method comprising:
receiving a first indication of a first information regarding at least one lender;
receiving a plurality of second indications, each of the plurality of second indications indicating a respective second information regarding a respective at least one of a plurality of borrowers; and
determining, for each respective borrower of the plurality of borrowers, a respective first percentage of a payment of interest associated with a respective loan from the at least one lender to the respective borrower to allocate to at least one referrer;
determining, for each respective borrower of the plurality of borrowers, a respective second percentage of a payment of principal associated with a respective loan from the at least one lender to the respective borrower to allocate to the at least one referrer, in which the first percentage and the second percentage are different; and
transmitting an indication of the allocations.

2. The system of claim 1, wherein the at least one referrer includes a referrer of the at least one lender.

3. The system of claim 2, in which the method further comprises receiving at least one indication of a referral of the at least one lender.

4. The system of claim 1, wherein the at least one referrer includes a referrer of at least one borrower of the plurality of borrowers.

5. The system of claim 4, in which the method further comprises receiving at least one indication of a referral of the at least one borrower of the plurality of borrowers.

6. The system of claim 1, wherein the first information includes an offered interest rate by the at least one lender.

7. The system of claim 1, wherein the first information includes at least one of an amount of money to be loaned, a loan term, and a loan restriction.

8. The system of claim 1, wherein each respective second information includes a desired interest rate of at least one respective borrower of the plurality of borrowers.

9. The system of claim 8, wherein the second information includes at least one of an amount of money to be borrowed, a desired loan term, and credit information.

10. The system of claim 1, wherein at least one of the first percentage and the second percentage is, at least in part, on whether a referee of the referrer is the lender or one of the plurality of borrowers.

11. A method comprising:
receiving, by a computer system configured to allocate, first information regarding at least one lender;
receiving, by the computer system, second information regarding at least one borrower; and
determining, by a processor of the computer system, a first percentage of a payment of interest associated with at least one loan from the at least one lender to the at least one borrower to allocate to at least one referrer;
determining, by the processor of the computer system, a second percentage of a payment of principal associated with the at least one loan from the at least one lender to the at least one borrower to allocate to the at least one referrer, in which the first percentage and the second percentage are different; and
providing, by the computer system, an indication of the allocations.

12. The method of claim 11, wherein the referrer includes a referrer of the at least one lender.

13. The method of claim 12, further comprising receiving, by the computer system, at least one indication of a referral of the at least one lender.

14. The method of claim 11, wherein the referrer includes a referrer of the at least one borrower.

15. The method of claim 14, further comprising receiving, by the computer system, at least one indication of a referral of the at least one borrower.

16. The method of claim 11, wherein the first information includes an offered interest rate by the at least one lender.

17. The method of claim 16, wherein the first information includes at least one of an amount of money to be loaned, a loan term, and a loan restrictions.

18. The method of claim 11, wherein the second information includes a desired interest rate of the at least one borrower.

19. The method of claim 18, wherein the second information includes at least one of an amount of money to be borrowed, a desired loan term, and credit information.

20. The method of claim 11 wherein at least one of the first percentage and the second percentage is based, at least in part, on whether a referee of the referrer is the lender or the borrower.

21. The system of claim 3, in which the indication of the referral includes a cookie saved on a remote computer system associated with the at least one lender.

22. The system of claim 5, in which the indication of the referral includes a cookie saved on a remote computer system associated with the at least one borrower.

23. The method of claim 13, in which the indication of the referral includes a cookie saved on a remote computer system associated with the at least one lender.

24. The method of claim 15, in which the indication of the referral includes a cookie saved on a remote computer system associated with the at least one borrower.

25. The system of claim 1, in which determining at least one of the respective first percentage and the respective second percentage includes determining based on an amount of interest associated with the respective loan.

26. The system of claim 1, in which determining at least one of the respective first percentage and the respective second percentage includes determining based on a number of referees associated with the referrer.

27. The method of claim 11, in which determining at least one of the first percentage and the second percentage includes determining based on an amount of interest associated with the loan.

28. The method of claim 11, in which determining at least one of the first percentage and the second percentage includes determining based on a number of referees associated with the referrer.

* * * * *